United States Patent
Takasu et al.

(10) Patent No.: US 10,707,474 B2
(45) Date of Patent: Jul. 7, 2020

(54) SECONDARY BATTERY AND METHOD FOR MANUFACTURING SAME

(71) Applicant: TOYOTA JIDOSHA KABUSHIKI KAISHA, Toyota-shi, Aichi-ken (JP)

(72) Inventors: Junta Takasu, Nagoya (JP); Yuuta Nemoto, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 147 days.

(21) Appl. No.: 15/941,408

(22) Filed: Mar. 30, 2018

(65) Prior Publication Data
US 2018/0287128 A1   Oct. 4, 2018

(30) Foreign Application Priority Data

Mar. 31, 2017 (JP) .................. 2017-070630

(51) Int. Cl.
*H01M 2/22* (2006.01)
*H01M 2/34* (2006.01)
*H01M 10/058* (2010.01)
*H01M 10/0525* (2010.01)

(52) U.S. Cl.
CPC ............. *H01M 2/345* (2013.01); *H01M 2/22* (2013.01); *H01M 10/058* (2013.01); *H01M 10/0525* (2013.01); *Y02E 60/122* (2013.01); *Y02T 10/7011* (2013.01)

(58) Field of Classification Search
CPC ..... H01M 2/345; H01M 2200/20; H01M 2/22
See application file for complete search history.

(56) References Cited

U.S. PATENT DOCUMENTS

2014/0113163 A1* 4/2014 Nagata .................. H01M 2/345
429/61

FOREIGN PATENT DOCUMENTS

JP 2003-282029 A 10/2003
JP 2016-110701 A 6/2016

* cited by examiner

*Primary Examiner* — Olatunji A Godo
(74) *Attorney, Agent, or Firm* — Sughrue Mion, PLLC

(57) ABSTRACT

Provided is a secondary battery including a pressure type current interrupt device with reduced welding failures and high productivity as a result. A secondary battery disclosed herein includes an electrode body, a battery case for housing the electrode body, an electrode terminal electrically connected to the electrode body, and a current interrupt device provided in a conduction path between the electrode body and the electrode terminal to interrupt the conduction path in response to increase in pressure in the battery case. The current interrupt device includes a rivet and a reverse plate welded to the rivet. The current interrupt device has one continuous welding mark. The one continuous welding mark has a circumferential part that is continuous circumferentially along an outer edge part of the reverse plate. The start and end points of the one continuous welding mark are positioned offset from the circumferential part.

7 Claims, 3 Drawing Sheets

SECONDARY BATTERY AND METHOD FOR MANUFACTURING SAME

BACKGROUND OF THE INVENTION

1. Field of the Invention

The present teaching relates to a secondary battery and a method for manufacturing the same. Note that the present application claims priority to Japanese Patent Application No. 2017-070630, filed Mar. 31, 2017, which is incorporated herein by reference in its entirety.

2. Description of the Related Art

In recent years, secondary batteries such as lithium ion secondary batteries (lithium secondary batteries) which are more lightweight and achieve higher energy densities than other existing batteries have become available as so-called portable power supplies for personal computers, mobile terminals or the like, and as vehicle driving power supplies. In particular, lithium ion secondary batteries which are lightweight and achieve high energy densities are expected to be more widely available in the future as, for example, high output power supplies for driving vehicles such as an electric vehicle (EV), a hybrid vehicle (HV), and a plug-in hybrid vehicle (PHV).

A high degree of safety, especially safety during overcharge is required of secondary batteries, particularly of lithium ion secondary batteries. The lithium ion secondary battery is generally a sealed battery and has increased battery voltage upon attaining an overcharged state by current in a prescribed level or higher passed therethrough for some reason, which increases the internal pressure and temperature of the battery. Therefore, the lithium ion secondary battery is provided with various safety measures against overcharge, an example of which is a pressure-sensitive current interrupt device (CID).

In connection with the pressure-sensitive current interrupt device, Japanese Patent Application Publication No. 2016-110701 indicates that a pressure-sensitive current interrupt device is produced by fixing a reverse plate to a rivet, and then laser beam welding an outer edge part of the reverse plate at its entire periphery so that the reverse plate is joined to the rivet.

SUMMARY OF THE INVENTION

According to the disclosure of Japanese Patent Application Publication No. 2016-110701, the laser beam welding is carried out only along the outer edge part of the reverse plate. Therefore, the laser beam welding is carried out circumferentially, and the start and end points in the laser beam welding are present on the circumference. When the start and end points are present on the circumference, the depth of fusion is more likely to be instable at the start point, and solidification cracks are easily generated at the end point, which may lead to welding failures. Therefore, there is still a room for improvement on the technique disclosed in Japanese Patent Application Publication No. 2016-110701 in terms of the productivity of current interrupt devices.

Therefore, it is an object of the present teaching to provide a secondary battery that includes a pressure type current interrupt device manufactured with reduced welding failures and thus high productivity.

The secondary battery disclosed herein includes an electrode body, a battery case for housing the electrode body, an electrode terminal electrically connected to the electrode body, and a current interrupt device provided in a conduction path between the electrode body and the electrode terminal to interrupt the conduction path in response to increase in pressure in the battery case. The current interrupt device includes a rivet and a reverse plate welded to the rivet. The current interrupt device has one continuous welding mark. The one continuous welding mark has a circumferential part that is continuous circumferentially along an outer edge part of the reverse plate. The start and end points of the one continuous welding mark are positioned offset from the circumferential part.

In this configuration, the start point of the welding mark (in other words, the start point in laser beam welding) and the end point of the welding mark (in other words, the end point in the laser beam welding) are apart from the circumferential part which is the joint part between the reverse plate and rivet, and therefore welding failures attributable to instability in the depth of fusion at the start point and solidification cracks generated at the end point can be eliminated. More specifically, the configuration allows welding failures to be reduced, so that a secondary battery including a pressure type current interrupt device manufactured with high productivity can be provided.

In a secondary battery according to a desired embodiment disclosed herein, the start and end points of the welding mark are present in the rivet.

In the configuration, the welding mark does not adversely affect the performance of the reverse plate.

In a secondary battery according to a more desired embodiment disclosed herein, the rivet has a region that protrudes toward the outside of the circumferential part of the welding mark on a surface that faces an inner side of the battery case and has the welding mark, and the start and end points of the welding mark are present in the region.

The configuration allows the start and end points of the welding mark to be easily provided at the rivet.

A method for manufacturing a secondary battery disclosed herein includes the steps of manufacturing a current interrupt device and assembling a secondary battery using the manufactured current interrupt device, and the current interrupt device manufacturing step includes fixing a reverse plate to a rivet so that an outer edge part of the reverse plate is in contact with the rivet, scanning with a welding laser beam from a first position apart from the outer edge part of the reverse plate to the outer edge part of the reverse plate, scanning with the welding laser beam circumferentially along the outer edge part of the reverse plate, and scanning with the welding laser beam to a second position apart from the outer edge part of the reverse plate.

In this manner, if the depth of fusion is instable at the start point or solidification cracks are generated at the end point, the reverse plate and the rivet can be welded together in a stable manner at the outer edge part of the reverse plate because the start and end points are apart from the outer edge part of the reverse plate, which is the joint part between the reverse plate and the rivet. More specifically, in this manner, welding failures are reduced, so that a secondary battery including a pressure type current interrupt device manufactured with high productivity can be provided.

In a method for manufacturing a secondary battery according to a desired embodiment disclosed herein, the first position apart from the outer edge part of the reverse plate and the second position apart from the outer edge part of the reverse plate are present on the rivet.

In this configuration, the laser beam welding does not adversely affect the performance of the reverse plate.

In a method for manufacturing a secondary battery according to a more desired embodiment disclosed herein, the rivet has a region that protrudes toward the outside of the outer edge part of the reverse plate on a surface to be subjected to laser beam welding, and the first position apart from the outer edge part of the reverse plate and the second position apart from the outer edge part of the reverse plate are present in the region.

In the configuration, the first position apart from the outer edge part of the reverse plate and the second position apart from the outer edge part of the reverse plate can easily be set on the rivet.

DESCRIPTION OF THE PREFERRED EMBODIMENTS

Figure 1:
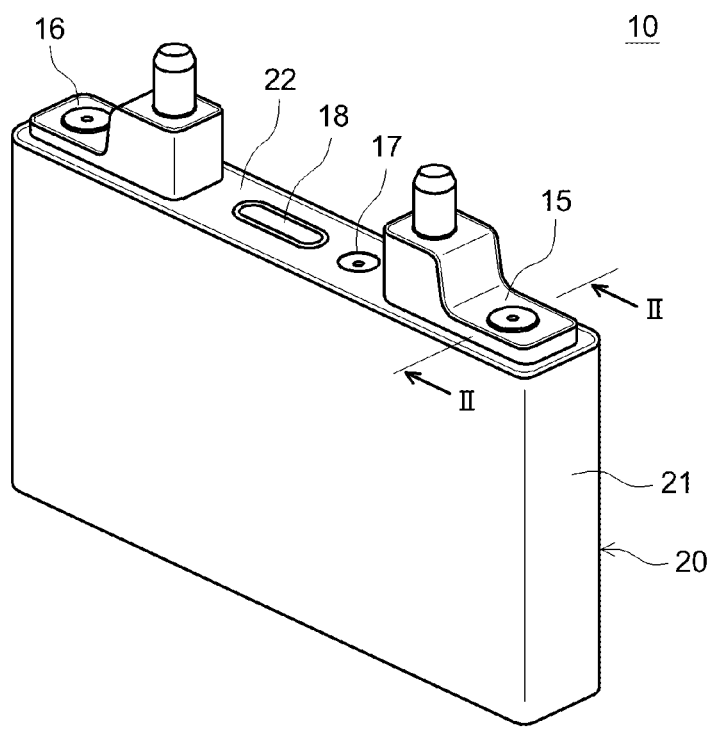
FIG. 1 is a schematic perspective view showing the outer shape of a lithium ion secondary battery according to one embodiment of the present teaching.

Now, embodiments of the present teaching will be described with reference to the accompanying drawings. It is noted that matters other than those specifically mentioned herein but necessary for carrying out the teaching (such as a general configuration of a secondary battery and a manufacturing process thereof which do not specify the present teaching) may be understood as design matters, to those skilled in the art, based on conventional techniques in the field of the art. The present teaching can be carried out on the basis of the content disclosed herein and common technical knowledge in the field of the art. In the drawings to be referred to in the following description, the members/portions having the same functions are designated by the same reference numerals. Dimensional arrangement (such as the lengths, widths, and thicknesses of elements) in the drawings does not reflect actual dimensional relation.

Now, a lithium ion secondary battery according to an embodiment of the present teaching will be described in detail by way of illustration, but the secondary battery according to the embodiment is not limited to the lithium ion secondary battery.

Note that the term "secondary battery" herein refers to a power storage device in general that can be repetitively charged/discharged and includes a so-called power storage battery and a power storage element such as an electric double layer capacitor. The term "lithium ion secondary battery" refers to a secondary battery in which lithium ions are used as a charge carrier and charge/discharge is achieved by the movement of electric charge associated with lithium ions between the positive and negative electrodes.

Figure 2:
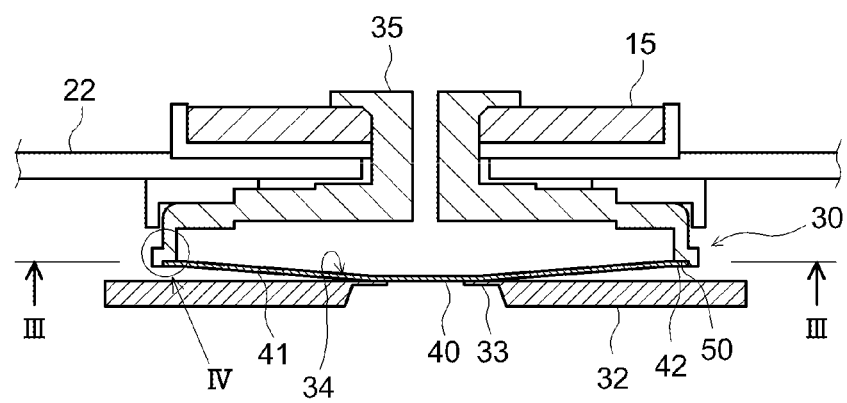
FIG. 2 is an enlarged schematic sectional view of a current interrupt device taken along line II-II in FIG. 1.

FIG. 1 is a schematic perspective view of the outer shape of a lithium ion secondary battery according to the embodiment. FIG. 2 is an enlarged schematic sectional view of a current interrupt device taken along II-II in FIG. 1.

As shown in FIG. 1, the lithium ion secondary battery 10 according to the embodiment is constructed by housing a flat shaped electrode body (not shown) together with an electrolyte (not shown) in a flat rectangular battery case 20. The lithium ion secondary battery 10 according to the embodiment is a sealed battery.

The case 20 includes a case main body 21 having an opening and a lid body 22 that closes the opening. The case main body 21 is formed into a rectangular parallelepiped box shape opened at its top. The lid body 22 is a rectangular plate shaped body and provided with a positive electrode external terminal 15 electrically connected to the positive electrode (not shown) of the electrode body and a negative electrode external terminal 16 electrically connected to the negative electrode (not shown) so that these terminals are exposed on an upper surface thereof (outside of the case 20). The lid body 22 is also provided with a liquid injection hole 17 for injecting the electrolyte and a safety valve 18. The material of the case 20 is not specifically limited, and aluminum or an aluminum alloy may desirably be used.

The materials and members for forming the electrode body are not particularly limited, and those included in a conventional lithium ion secondary battery may be used. For example, a wound electrode body produced by winding a layered body including a long sheet-shaped positive electrode, a long sheet-shaped separator, and a long sheet-shaped negative electrode may be used or a layered electrode body including sheet-shaped positive electrodes, sheet-shaped separators, and sheet-shaped negative electrodes placed upon one another may be used.

The positive electrode used for the electrode body may be configured to have a positive electrode active material layer formed on a sheet-shaped positive electrode collector (such as an aluminum foil). As the positive electrode active material included in the positive electrode active material layer, one or two or more materials used for conventional lithium ion secondary batteries can be used without any particular limitation. Desirable examples of the positive electrode active material may include lithium composite metal oxide (such as $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and $LiFePO_4$) having a layered structure or a spinel structure.

The negative electrode used for the electrode body may be configured to have a negative electrode active material layer formed on a sheet-shaped negative electrode collector (such as a copper foil). As the negative electrode active material included in the negative electrode active material layer, one or two or more materials used for conventional lithium ion secondary batteries can be used without any particular limitation. Desirable examples of the negative electrode active material may include carbon materials such as graphite (natural graphite and artificial graphite) and low crystalline carbon (hard carbon and soft carbon).

As the separator, a separator used for a conventional lithium ion secondary battery can be used without any particular limitation. A desirable example of the separator may include a porous sheet of polyolefin based resin.

As the electrolyte, a non-aqueous electrolyte used for a conventional lithium ion secondary battery can be used without any particular limitation. A desirable example of the electrolyte may include a non-aqueous electrolyte containing a supporting salt such as lithium salt (desirably $LiPF_6$) in any of non-aqueous solvents such as carbonates. Note that a solid or gel type electrolyte may be used instead of the electrolytic solution.

The case 20 is provided therein with a current interrupt device 30 which is activated in response to increase in the case internal pressure. The current interrupt device 30 is provided in a conduction path between the positive electrode (not shown) of the electrode body and the positive electrode external terminal 15. The current interrupt device 30 is configured to interrupt charging current by interrupting the condition path from the positive electrode external terminal 15 to the positive electrode when for example gas is generated inside the case 20 due to overcharge of the lithium ion secondary battery 10 and the case internal pressure increases as a result.

More specifically, as shown in FIG. 2, the current interrupt device 30 includes a connection member 32 electrically connected to the positive electrode to function as a positive electrode collecting terminal and a reverse plate 34 electrically connected to the connection member 32, and a rivet 35 electrically connected to the reverse plate 34 and communicating between the inside and the outside of the case. The connection member 32, the reverse plate 34, and the rivet 35 are provided in this order from the inner side to the outer side of the case and conductive members made of metal. These members serve as a conduction path for conducting between the positive electrode and the positive electrode external terminal 15 exposed to the outside of the case, and each constitute a part of the conduction path. The lithium ion secondary battery 10 is charged/discharged through the conduction path. Aluminum or an aluminum alloy is desirably used for the conduction members.

The connection member 32 includes a part having a plate shape (plate-shaped part), and the plate-shaped part has a connection portion 33 connected to the reverse plate 34.

The reverse plate 34 contacts the connection portion 33 and is electrically connected to the connection portion as a result. According to the embodiment, the reverse plate 34 is a circular plate member. The reverse plate 34 has a central part 40 positioned in the center to protrude relatively toward the inner side of the case (downward in FIG. 2). A peripheral part 41 positioned at the periphery of the central part 40 is inclined upward to the outer side of the case in the outward direction of the reverse plate 34. The reverse plate 34 is welded to the rivet 35 at an outer edge part 42 thereof. Note that the outer shape of the reverse plate 34 is not limited to the circular shape and may be any other shape such as a rectangular shape.

The rivet 35 is fitted into a through hole formed at the lid body 22. The rivet 35 has a recessed space on the inner side of the case. A stepped portion 50 is formed at the tip end part of the outer peripheral wall surface of the recessed space. The outer edge part 42 of the reverse plate 34 is disposed at the stepped portion 50. The stepped portion 50 has a shape that allows the reverse plate 34 to be stored therein and more specifically includes a flat shaped bottom and a wall. The depth of the stepped portion 50 is substantially equal to the thickness of the outer edge part 42 of the reverse plate 34.

The rivet 35 abuts against the positive electrode external terminal 15 at a part of its outer peripheral surface, so that the rivet and the positive electrode external terminal are electrically connected with each other. Note that the rivet 35 has a communication hole in communication with the inside and outside of the case. The rivet 35 may consist of a single member or multiple members fitted with one another.

The reverse plate 34 is configured to be reversible to the side of the rivet 35 in response to increase in the case internal pressure (in other words, the central part 40 can move toward the outer side of the case away from the connection member 32). Therefore, when the internal pressure in the battery increases, the reverse plate 34 is reversed to the side of the rivet 35, so that the electrical connection between the connection portion 33 and the reverse plate 34 is interrupted.

Figure 3:
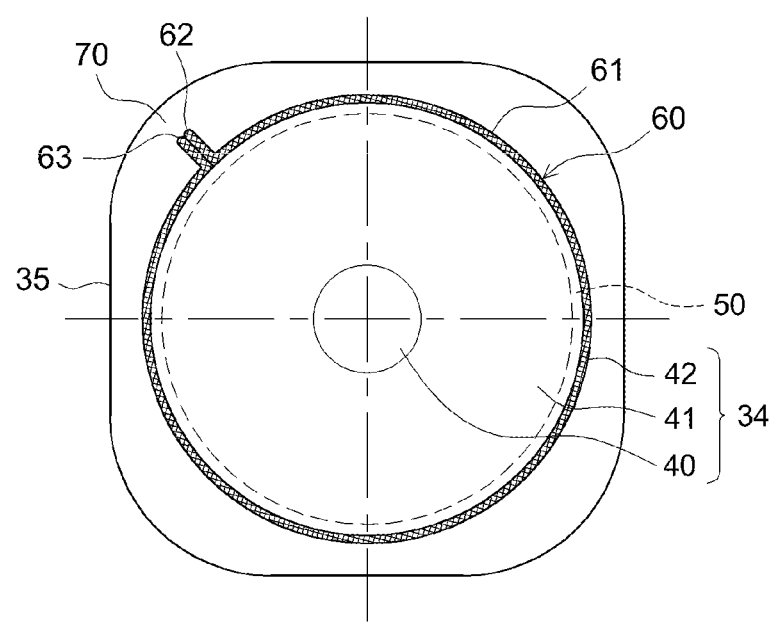
FIG. 3 is a sectional view of the current interrupt device taken along line III-III in FIG. 2.

Now, the welded state between the reverse plate 34 of the current interrupt device 30 and the rivet 35 will be described. FIG. 3 is a sectional view of the current interrupt device 30 taken along line III-III in FIG. 2.

As shown in FIG. 3, the current interrupt device 30 has a single continuously formed welding mark 60. The single continuous welding mark 60 has a circumferential part 61 that continues circumferentially along the outer edge part 42 of the reverse plate 34. The circumferential part 61 joins the reverse plate 34 and the rivet 35.

The start point 62 and the end point 63 of the single continuous welding mark 60 are positioned offset from the circumferential part 61.

In this configuration, the start point 62 of the welding mark 60 (in other words, the start point in laser beam welding) and the end point 63 of the welding mark 60 (in other words, the end point in laser beam welding) are apart from the circumferential part 61 which is the joint part between the reverse plate 34 and the rivet 35, and therefore welding failures attributable to instability in the depth of fusion at the start point and solidification cracks generated at the end point can be eliminated.

Note that in FIG. 3, the start point 62 and the end point 63 of the welding mark 60 are adjacent to each other, but the positions of the start point 62 and the end point 63 of the welding mark 60 are not limited to this arrangement as long as the circumferential part 61 that is continuous circumferentially can be formed and these points are offset from the circumferential part 61. For example, the start point 62 and the end point 63 of the welding mark 60 may be in the same position. Alternatively, the start point 62 and the end point 63 of the welding mark 60 may be positioned apart from each other. More specifically, the segment from the start point 62 of the welding mark 60 to the circumferential part 61 and the segment from the end point 63 of the welding mark 60 to the circumferential part 61 form a V shape, and the start point 62 and the end point 63 of the welding mark 60 may be positioned apart from each other.

Note that the welding mark 60 is a single continuous mark to form one line in a flat surface orthogonal to the depth-wise direction of the welding mark 60 and therefore has two or less ends. Therefore, an end is usually at least either the start point 62 or the end point 63. The start point 62 and the end point 63 of the welding mark 60 can be determined by observing the state of the welding mark such as the depth of the welding mark.

The start point 62 and the end point 63 of the welding mark 60 may be present either in the reverse plate 34 or the rivet 35, while the start point 62 and the end point 63 of the welding mark 60 are desirably present in the rivet 35 in order to prevent adverse effects on the performance of the reverse plate 34.

On a surface facing the inner side of the battery case and having the welding mark 60 formed thereon, the contour of the outer shape of the rivet 35 may be circular. However, according to the embodiment, the contour of the outer shape of the rivet 35 is a square having rounded corners. In this manner, the rivet 35 has a region 70 that protrudes toward the outside of the circumferential part 61 of the welding mark 60, and the start point 62 and the end point 63 of the welding mark 60 are present in the region 70. In this way, the start point 62 and the end point 63 of the welding mark 60 can be provided more easily at the rivet 35 by providing the rivet 35 with the region 70 that protrudes toward the outside of the circumferential part 61 of the welding mark 60.

According to the embodiment, the contour of the outer shape of the rivet 35 is a square having rounded corners. However, in order to form the region 70 that protrudes toward the outside of the circumferential part 61 of the welding mark 60, the contour of the outer shape of the rivet 35 are allowed only to have a non-circular shape.

Note that in the region 70 that protrudes toward the outside of the circumferential part 61 of the welding mark 60, the distance from a point on the contour of the outer shape of the rivet 35 to the center of the reverse plate 34 is greater than in the other region.

According to the embodiment, the current interrupt device 30 is provided between the positive electrode external terminal 15 fixed at the lid body 22 and the positive electrode (not shown) but the arrangement is not limited to this. The current interrupt device 30 may be provided on the positive electrode side or/and the negative electrode side. The configuration and method for providing the current interrupt device in the conduction path for the negative electrode are basically the same as the case for the positive electrode and therefore the description thereof will not be repeated here.

The lithium ion secondary battery 10 having the above-described configuration finds various applications. The battery is desirably used for a driving power supply provided in a vehicle such as an electric vehicle (EV), a hybrid vehicle (HV), and a plug-in hybrid vehicle (PHV). The lithium ion secondary battery 10 may be used in the form of a battery pack that typically includes a plurality of batteries connected in series and/or in parallel.

Now, a method for manufacturing a secondary battery according to the embodiment will be described. The method for manufacturing a secondary battery according to the embodiment includes the step of manufacturing a current interrupt device (hereinafter also referred to as the "current interrupt device manufacturing step") that includes fixing a reverse plate to a rivet so that an outer edge part of the reverse plate is in contact with the rivet, scanning with a welding laser beam from a first position apart from the outer edge part of the reverse plate to the outer edge part of the reverse plate, scanning with the welding laser beam circumferentially along the outer edge part of the reverse plate, scanning with the welding laser beam to a second position apart from the outer edge part of the reverse plate, and the step of assembling a secondary battery using the manufactured current interrupt device (hereinafter also referred to as the "secondary battery assembling step").

Figure 4:
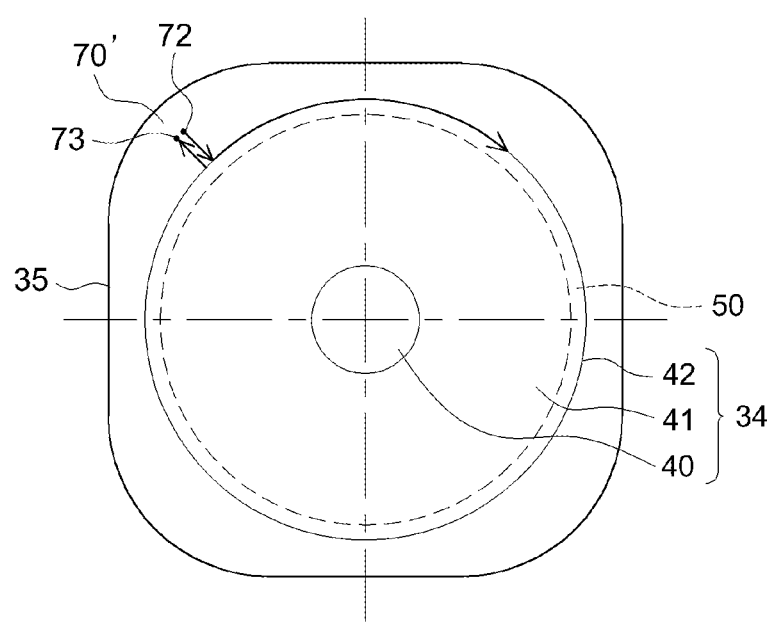
FIG. 4 is a schematic view of a rivet and a reverse plate viewed from a side corresponding to the inner side of the battery case for illustrating laser beam welding in a method for manufacturing a secondary battery according to one embodiment of the present teaching.

The current interrupt device manufacturing step will be described with reference to the drawings. FIG. 4 is a schematic view of the rivet and the reverse plate as viewed from a side corresponding to the inner side of the battery case for illustrating laser beam welding in the method for manufacturing a secondary battery according to one embodiment of the present teaching.

In the current interrupt device manufacturing step, the reverse plate is fixed to the rivet so that an outer edge part of the reverse plate is in contact with the rivet. For example as shown in FIG. 2, the reverse plate 34 is stored in the recessed space of the rivet 35 so that the outer edge part 42 of the reverse plate 34 is disposed at the stepped portion 50 of the rivet 35. In this way, the reverse plate 34 can be fixed to the rivet 35 while the outer edge part 42 of the reverse plate 34 is in contact with the rivet 35. In order to enhance the fixation, temporary welding, etc. may be carried out according to a known method.

Then, scanning with the welding laser beam is carried out from the first position apart from the outer edge part of the reverse plate to the outer edge part of the reverse plate. As shown in FIG. 4, the scanning with the welding laser beam from a point 72 apart from the outer edge part 42 of the reverse plate 34 to the outer edge part 42 of the reverse plate 34 is carried out as indicated by the arrow. The point 72 is a start point in laser beam welding. Note that in FIG. 4, the scanning with the welding laser beam from the point 72 to the outer edge part 42 of the reverse plate 34 is carried out so that the operation distance is minimized. However, the scanning with the welding laser beam from the point 72 to the outer edge part 42 of the reverse plate 34 does not have to be carried out so that the operation distance is minimized.

Then, scanning with the welding laser beam is carried out circumferentially along the outer edge part. For example as shown in FIG. 4, the reverse plate is scanned circumferentially from the point where the welding laser beam reaches the outer edge part 42 of the reverse plate 34 along the outer edge part 42 of the reverse plate 34 as indicated by the arrow. Note that in FIG. 4, the scanning with the welding laser beam is carried out in the clockwise direction. However, the direction is not limited to this and the scanning with the welding laser beam may be carried out in the anticlockwise direction. Here, the scanning with the welding laser beam is carried out entirely around the outer edge part 42 of the reverse plate 34.

Then, scanning with the welding laser beam is carried out to a second position apart from the outer edge part of the reverse plate. For example, as shown in FIG. 4, after the scanning with the welding laser beam is performed entirely around the outer edge part 42 of the reverse plate 34, the scanning is continued up to the point 73 apart from the outer edge part 42 of the reverse plate 34. The point 73 is the end point in the laser beam welding.

Note that while the points 72 and 73 may be positioned either on the reverse plate 34 or the rivet 35, the points 72 and 73 are desirably on the rivet 35 in order to eliminate adverse effects on the performance of the reverse plate 34.

Note that in FIG. 4, the point 72 as the first position and the point 73 as the second position are set in separate positions but the positions of the points are not specifically limited and may be in the same position as long as the positions are apart from the outer edge part of the reverse plate.

In FIG. 4, similarly to FIG. 2, on a surface of the rivet 35 facing the inner side of the battery case to be subjected to welding, the contour of the outer shape of the rivet 35 is a non-circular shape or more specifically a square shape having rounded corners. In this manner, the rivet 35 has a region 70' that protrudes toward the outside of the outer edge part 42 of the reverse plate 34. The points 72 and 73 can be set more easily at the rivet 35 by providing the rivet 35 with the region 70' that protrudes toward the outside of the outer edge part 42 of the reverse plate 34.

The current interrupt device can be manufactured by performing the laser beam welding and known methods about the other elements. According to the method, welding failures in the current interrupt device can be reduced. More specifically, if the depth of fusion is instable at the start point (point 72) or solidification cracks are generated at the end point (point 73), the reverse plate 34 and the rivet 35 can be welded together in a stable manner at the outer edge part 42 of the reverse plate 34 because the start point (point 72) and the end point (point 73) are apart from the outer edge part 42 of the reverse plate 34, which is the joint part between the reverse plate 34 and the rivet 35.

Now, the secondary battery assembling step will be described. In the secondary battery assembling step, a secondary battery is assembled using the manufactured current interrupt device. The step can be performed according to a known method.

As described above, a secondary battery can be manufactured. According to the method for manufacturing a secondary battery according to the embodiment, welding failures are reduced during the manufacture of the current interrupt device, and the yield of the secondary batteries in total can be improved.

While specific examples of the present teaching have been described, the same is only for the purpose of illustration and does not limit the scope of claims. The techniques recited in the claims include various modifications and variations of the specific examples described above.

What is claimed is:

1. A secondary battery, comprising:
   an electrode body;
   a battery case for housing the electrode body;
   an electrode terminal electrically connected to the electrode body; and
   a current interrupt device provided in a conduction path between the electrode body and the electrode terminal to interrupt the conduction path in response to increase in pressure in the battery case,
   the current interrupt device including a rivet and a reverse plate welded to the rivet,
   the current interrupt device having one continuous welding mark,
   the one continuous welding mark having a circumferential part that is continuous circumferentially along an outer edge part of the reverse plate, and start and end points of the one continuous welding mark being positioned offset from the circumferential part.

2. The secondary battery according to claim 1, wherein the start and end points of the welding mark are present in the rivet.

3. The secondary battery according to claim 2, wherein the rivet has a region that protrudes toward the outside of the circumferential part of the welding mark on a surface that faces an inner side of the battery case and has the welding mark, and the start and end points of the welding mark are present in the region.

4. A method for manufacturing a secondary battery, comprising the steps of:
   manufacturing a current interrupt device; and
   assembling a secondary battery using the manufactured current interrupt device,
   the current interrupt device manufacturing step including:
   fixing a reverse plate to a rivet so that an outer edge part of the reverse plate is in contact with the rivet;
   scanning with a welding laser beam from a first position apart from the outer edge part of the reverse plate to the outer edge part of the reverse plate;
   scanning with the welding laser beam circumferentially along the outer edge part of the reverse plate; and
   scanning with the welding laser beam to a second position apart from the outer edge part of the reverse plate.

5. The method for manufacturing a secondary battery according to claim 4, wherein the first position apart from the outer edge part of the reverse plate and the second position apart from the outer edge part of the reverse plate are present on the rivet.

6. The method for manufacturing a secondary battery according to claim 5, wherein the rivet has a region that protrudes toward the outside of the outer edge part of the reverse plate on a surface to be subjected to laser beam welding, and the first position apart from the outer edge part of the reverse plate and the second position apart from the outer edge part of the reverse plate are present in the region.

7. The secondary battery according to claim 1, wherein the first position and the second position are each offset from the circumferential part of the one continuous welding mark in a radially outward direction.

* * * * *